(12) United States Patent
Remington, Jr.

(10) Patent No.: US 8,609,197 B1
(45) Date of Patent: Dec. 17, 2013

(54) PREPARING GLASS CONTAINERS FOR ELECTROSTATIC COATING

(75) Inventor: Michael P. Remington, Jr., Toledo, OH (US)

(73) Assignee: Owens-Brockway Glass Container Inc., Perrysburg, OH (US)

( * ) Notice: Subject to any disclaimer, the term of this patent is extended or adjusted under 35 U.S.C. 154(b) by 177 days.

(21) Appl. No.: 13/074,821

(22) Filed: Mar. 29, 2011

(51) Int. Cl.
*B05D 1/04* (2006.01)

(52) U.S. Cl.
USPC ............. 427/470; 427/475; 427/486; 65/60.2

(58) Field of Classification Search
USPC ............................. 427/470, 475, 486; 65/60.2
See application file for complete search history.

(56) References Cited

U.S. PATENT DOCUMENTS

| | | | |
|---|---|---|---|
| 3,522,075 A | 7/1970 | Kiel | |
| 4,099,486 A | 7/1978 | Bialorucki et al. | |
| 4,500,567 A * | 2/1985 | Kato et al. | 427/255.35 |
| 5,124,180 A | 6/1992 | Proscia | |
| 5,453,304 A * | 9/1995 | Scholes | 427/469 |
| 5,629,050 A | 5/1997 | Silvis et al. | |
| 5,698,262 A | 12/1997 | Soubeyrand et al. | |

FOREIGN PATENT DOCUMENTS

DE    2450260 A  *  5/1976

\* cited by examiner

*Primary Examiner* — Frederick Parker

(57) ABSTRACT

A glass container and related methods of manufacturing and coating glass containers. The container includes a hot end coating that is deposited on an exterior surface and that includes a metal oxide, and a dopant to reduce electrical resistivity of the exterior surface of the container. The container also includes an organic coating electrostatically applied to the exterior surface of the container. Preferably, the organic coating is applied at an ambient temperature and without having to use grounding pins, without having to heat the container, and without having to apply an additional conductive coating layer.

19 Claims, 1 Drawing Sheet

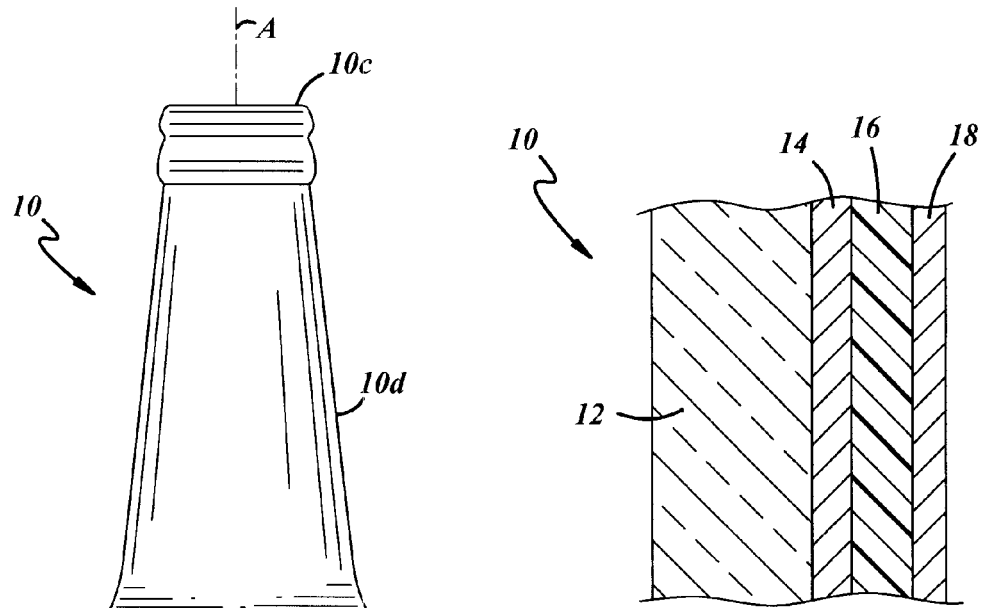
FIG. 3
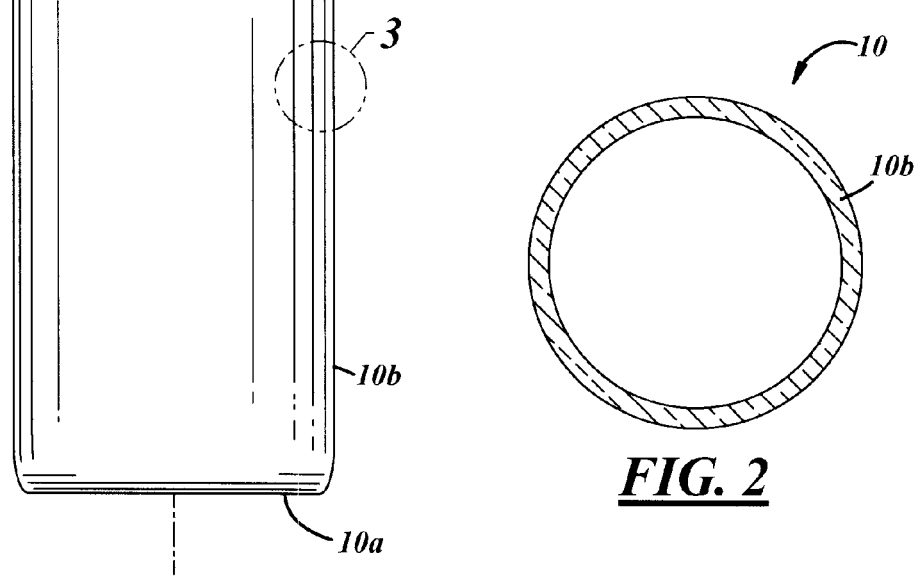
FIG. 2
FIG. 1

PREPARING GLASS CONTAINERS FOR ELECTROSTATIC COATING

The present disclosure is directed to glass containers, coating processes for glass containers including methods and materials for coating glass containers (e.g., glass bottles and jars), and to preparing glass containers for electrostatic coating.

BACKGROUND AND SUMMARY OF THE DISCLOSURE

Various processes have been developed to apply coatings to glass containers for different purposes, including decoration, adhesion and glass strengthening for damage prevention. For example, U.S. Pat. No. 3,522,075 discloses a process for coating a glass container in which the container is formed, coated with a layer of metal oxide such as tin oxide, cooled through a lehr, and then coated with an organopolysiloxane resin-based material over the metal oxide layer. In another example, U.S. Pat. No. 4,099,486 discloses a process for electrostatically coating a glass container, which is electrically conductive so that a charge differential can be created by grounding the container. The process includes supporting a container in an inverted position on a non-conductive chuck, and contacting a ground pin with a neck finish of the container or longitudinally extending the ground pin into the interior of the container and into contact with an inside bottom of the container to complete a ground path. The process also includes heating the container to the range of 150-400 degrees Fahrenheit to reduce surface resistivity, and increase conductivity, of the container, and then spraying the container with charged particles, which are attracted to the conductive grounded surface of the container.

A general object of the present disclosure, in accordance with one aspect of the disclosure, is to provide a glass container with an electrically conductive surface, which may allow the container to be electrostatically coated without the need to use grounding pins, to heat containers to increase surface conductivity, and/or to apply an additional conductive coating layer.

The present disclosure embodies a number of aspects that can be implemented separately from or in combination with each other.

A method of coating a glass container in accordance with one aspect of the disclosure includes the steps of (a) contacting an exterior surface of the container with a mixed gas including a metal compound and a dopant compound including at least one dopant selected from the group consisting of F, Cl, B, P, and Sb, to form a doped metal oxide coating on the exterior surface of the container to reduce electrical resistivity of the exterior surface of the container, and (b) electrostatically applying an organic coating to the exterior surface of the container after step (a). According to a preferred aspect of this method, the organic coating may be applied at an ambient temperature, without having to use grounding pins, without having to heat the container, and without having to apply an additional conductive coating layer after depositing the hot end coating.

In accordance with a further aspect of the disclosure, there is provided a glass container that includes a closed base at one axial end of the container, a body extending axially from the closed base and being circumferentially closed, and an open mouth at another axial end of the container opposite of the base. An exterior surface of the container includes an organic coating electrostatically applied over an electrically conductive hot end coating that includes a metal oxide and a dopant selected from the group consisting of: F, Cl, B, P, and Sb.

In accordance with another aspect of the disclosure, there is provided a method of manufacturing a glass container including the steps of forming the container, applying a hot end coating to an exterior surface of the container, wherein the hot end coating includes a metal oxide, and a dopant to reduce electrical resistivity of the exterior surface of the container. The method also includes annealing the container, applying a cold end coating to the exterior surface of the container, inspecting the container, and electrostatically depositing an organic coating on the container without having to use grounding pins, without having to heat the container, and without having to apply an additional conductive coating layer after applying the hot end coating.

BRIEF DESCRIPTION OF THE DRAWINGS

The disclosure, together with additional objects, features, advantages and aspects thereof, will be best understood from the following description, the appended claims and the accompanying drawings, in which:

FIG. 1 is an elevational view of a glass container in accordance with an exemplary embodiment of the present disclosure;

FIG. 2 is a cross-sectional view of the glass container body before coating; and FIG. 3 is an enlarged sectional view of the glass container, taken from circle 3 of FIG. 1.

DETAILED DESCRIPTION OF PREFERRED EMBODIMENTS

FIG. 1 illustrates an exemplary embodiment of a glass container 10 that may be produced in accord with an exemplary embodiment of a manufacturing process presently disclosed hereinbelow. The glass container 10 includes a longitudinal axis A, a base 10a at one axial end of the container 10 that is closed in an axial direction, a body 10b extending in an axial direction from the axially closed base 10a, and a mouth 10c at another axial end of the container 10 opposite of the base 10a. In the illustrated embodiment, the container 10 also includes a neck 10d that may extend axially from the body 10b, may be generally conical in shape, and may terminate in the mouth 10c. However, the container 10 need not include the neck 10d and the mouth 10c may terminate the body 10b, such as in a glass jar embodiment or the like.

The body 10b may be of any suitable shape in cross-section transverse to the axis A as long as the body 10b is circumferentially closed. For example, as shown in FIG. 2, the body 10b may be of cylindrical transverse cross-sectional shape that is circumferentially closed. In other embodiments, the body 10b may be generally oval, square, rectangular, or of any other suitable transverse cross-sectional shape.

FIG. 3 illustrates that the container 10 includes a glass substrate 12, a hot end coating 14 applied to an exterior surface of container 10 on the substrate 12, a cold end coating 16 applied to the exterior surface of container 10 over the hot end coating 14, and an organic coating 18 applied to the exterior surface of container 10 over the cold end coating 16.

Although the various coatings 14-18 are shown as adjacent layers overlying one another sequentially, one or more of the coatings may penetrate into or even through one or more of the other coatings. Accordingly, the various coatings 14-18 may be fairly described as being applied generally to the glass container 10, regardless of how or to what extent any given coating contacts any of the other coatings and/or the substrate 12. Similarly, when a material is described as being applied to an exterior surface of the glass container 10, the material may be applied to one or more of the coatings 14-18 and/or to the glass substrate 12 itself.

Glass containers can be produced in any suitable manner. This typically would involve a "hot end" including one or more melting furnaces, forming machines, and annealing lehrs, and a "cold end" after the annealing lehr(s) and including inspection equipment and packaging machines. Accordingly, a hot end coating is a coating applied at the hot end of the glass container manufacturing process prior to the annealing lehr, and a cold end coating is a coating applied after the annealing lehr at the cold end of the glass container manufacturing process.

After forming glass containers with forming machines, but prior to annealing, the glass containers may be hot-end coated in any suitable manner. For example, the glass containers may be coated, for instance, under a hood between the forming machines and an annealing lehr.

In one embodiment, the exterior surface of the container 10 is contacted with a mixed gas including a metal compound and a dopant compound including at least one dopant to form a doped metal oxide coating on the exterior surface of the container to produce the hot-end coating 14 and to reduce electrical resistivity of the exterior surface of the container. The hot-end coating 14 includes a metal oxide. For example, the metal oxide may include oxides of tin, titanium, vanadium, zirconium, and/or the like. Also, the hot-end coating 14 includes a dopant. For example, the dopant may include fluorine (F), chlorine (Cl), boron (B), phosphorous (P), and/or antimony (Sb). Accordingly, the dopant compound includes at least one dopant selected from the group consisting of F, Cl, B, P, and Sb.

During deposition of the hot end coating 14, molecular precursors of the dopant may be added into a gas phase of the precursor to the metal oxide, for example, by chemical vapor deposition. Any suitable source of the dopant molecules or precursor and any suitable means to vaporize the dopant precursor may be used. In one embodiment, the dopant precursor may be vaporized in a hot end coating hood depending on vapor pressure of the dopant precursor. In another embodiment, the dopant precursor may be volatilized separately and then delivered to the hot end coating hood. Once vaporized, the dopant precursor gas is mixed with the metal oxide precursor gas, for example, in the hot end coating hood, where the coating 14 is deposited on the containers. Accordingly, the metal oxide is one constituent of the hot end coating 14, and the dopant is another constituent of the hot end coating 14.

In an exemplary embodiment, the resulting coating 14 may have a generic formula of $SnO_2$:D where D is the dopant atom. In a particular example, a tin oxide may be provided from a gaseous form of monobutyl tin trichloride or any other suitable compounds, and the dopant may be provided from hydrogen fluoride, tri-fluoro acetic acid (TFA), or any other suitable compounds to provide a fluoride dopant. In another example, antimony trichloride ($SbCl_3$), antimony pentachloride ($SbCl_5$), triphenyl antimony (($C_6H_5)_3Sb$), or any other suitable compounds, may be used to provide an antimony dopant.

A desired electrical resistivity of the coating 14 or exterior surface of the container 10 may be achieved by adjusting the concentration of the dopant and/or by varying the thickness of the coating 14. For example, the dopant concentration and/or coating thickness may be adjusted to achieve electrical resistivities less than or equal to $10^{10}$ Ohm-cm and, preferably, in the range of about $10^4$ to $10^{10}$ Ohm-cm and, more preferably, less than or equal to $10^6$ Ohm-cm. In any event, the thickness of the coating 14 should be low enough so as to not alter container aesthetics including high silver reflected color, high iridescence, and/or the like. Example thicknesses range from about ten to forty nm. One of ordinary skill in the art will recognize that reducing the electrical resistivity of the coating 14 has a concomitant effect of increasing electrical conductivity of the coating 14 and, thus, increasing electrical conductivity of the exterior surface of the container 10.

The glass containers then may be annealed in any suitable manner, for example, in an annealing lehr.

At or downstream of the annealing operation, the glass containers may be cold-end coated in any suitable manner. For example, the glass containers may be coated with the cold end coating 16, which may be a protective organic coating applied downstream or at an end of the annealing lehr. The cold end coating 16 may include a polyethylene material, like a polyethylene wax or the like, or may include any other suitable cold end coating material.

After the cold end coating is applied, the glass containers may be inspected for any suitable characteristics and in any suitable manner. For example, the glass containers may be manually or automatically inspected for cracks, inclusions, surface irregularities, hot end and/or cold end coating properties, and/or the like.

The organic coating 18 is electrostatically applied to exterior surfaces of the glass containers, for example, after inspection. More specifically, the organic coating 18 may be electrostatically applied to the exterior surfaces of the containers, for example, over the hot end coating 14. The organic coating 18 may be applied in any suitable manner by any suitable equipment, for instance, by suspending the containers 10 from a conveyor and holding the neck finishes thereof with a chuck in contact with the doped hot end coating 14. In one embodiment, before electrostatically organic coating the containers 10, the cold end coating 16 may be entirely or partially removed by flame or plasma treatment. In another embodiment, the organic coating 18 may be applied to the exterior surfaces of the containers 10 over the cold end coating 16. In this embodiment, the cold end coating 16 may be discontinuous and/or may contain surfactants that may render the container exterior surface sufficiently electrically conductive. In any event, the coating 18 is electrostatically applied to the glass containers without the need for grounding pins, without having to heat the containers to increase surface electrical conductivity, and/or without having to apply one or more separate conductive coating layers. In fact, the coating 18 may be applied in conditions under 150 degrees Fahrenheit and, preferably, at an ambient temperature. As used herein, the terminology "ambient temperature" may include the temperature of the surrounding container manufacturing environment. Accordingly, the presently disclosed method may enable coating at temperatures cooler than those of conventional processes.

After applying the organic coating, the glass containers may be cured in any suitable manner. For example, the curable organic coating may be a radiation-curable organic coating cured by any suitable type of radiation like, for instance, ultraviolet or electron beam radiation.

After curing, the glass containers may be packaged in any suitable manner.

The manufacturing process may or may not include all of the disclosed steps or be sequentially processed or processed in the particular sequence discussed, and the presently disclosed manufacturing process and coating methods encompass any sequencing, overlap, or parallel processing of such steps.

The present disclosure provides an advancement in the art. Conventionally, it has been understood that successful electrostatic coating required heating containers to 150-400 degrees Fahrenheit to increase surface electrical conductivity and/or application of separate conductive coating layers, and use of grounding pins in container handling devices. Contrary to conventional wisdom, it is now possible to produce glass containers with an organic coating electrostatically applied with a high yield (e.g. on the order of about 80% or more) without having to resort to one or more of the aforementioned undesirable process steps. In contrast, the addition of the dopant to the hot end coating of the presently disclosed method provides a simple but elegant solution to a problem in the art of glass container manufacturing that has long been experienced but apparently unappreciated.

There thus has been disclosed methods of coating glass containers and methods of manufacturing glass containers that at least partially satisfy one or more of the objects and aims previously set forth. The disclosure has been presented in conjunction with several exemplary embodiments, and additional modifications and variations have been discussed. Other modifications and variations readily will suggest themselves to persons of ordinary skill in the art in view of the foregoing discussion. The disclosure is intended to embrace all such modifications and variations as fall within the spirit and broad scope of the appended claims.

The invention claimed is:

1. A method of coating a glass container, which includes the steps of:
    (a) contacting an exterior surface of the container with a mixed gas including a metal compound and a dopant compound including at least one dopant selected from the group consisting of F, Cl, B, P, and Sb, to form a doped metal oxide coating on said exterior surface of the container to reduce electrical resistivity of said exterior surface of the container; and
    (b) electrostatically applying an organic coating to said exterior surface of the container after step (a) and being carried out at less than 150 degrees Fahrenheit.

2. The method set forth in claim 1 wherein said step (a) is carried out by chemical vapor deposition.

3. The method set forth in claim 1 wherein said doped metal oxide coating of said step (a) includes $SnO_2$ and at least one of F or Sb.

4. The method set forth in claim 1 wherein step (b) is carried out such that the container is suspended from a conveyor and a neck finish of the container is held with a chuck in contact with the doped hot end coating.

5. The method set forth in claim 1 further including the step of:
    (c) curing said organic coating.

6. The method set forth in claim 1 including the step, prior to said step (b), of applying a cold end coating to the container.

7. The method set forth in claim 1 including the steps, prior to said step (b), of applying a cold end coating to the container, and inspecting the container.

8. The method set forth in claim 1 wherein step (b) is carried out without having to use grounding pins, without having to heat the container, and without having to apply an additional conductive coating layer after step (a).

9. The method set forth in claim 1 wherein step (b) is carried out at an ambient temperature.

10. The method set forth in claim 6 wherein said cold end coating is at least partially removed before step (b).

11. The method set forth in claim 1, wherein the coating is ten to forty nm in thickness.

12. The method set forth in claim 1 wherein said exterior surface has a electrical resistivity of less than or equal to $10^{10}$ Ohm-cm after step (a).

13. The method set forth in claim 1 wherein said exterior surface has a electrical resistivity of less than or equal to $10^6$ Ohm-cm after step (a).

14. A method of manufacturing a glass container, which includes the steps of:
    (a) forming the container,
    (b) applying a hot end coating to an exterior surface of the container, wherein said hot end coating includes a metal oxide, and a dopant to reduce electrical resistivity of said exterior surface of the container,
    (c) annealing the container coated in step (b),
    (d) applying a cold end coating to said exterior surface of the container,
    (e) inspecting the container, and
    (f) electrostatically depositing an organic coating on the container at less than 150 degrees Fahrenheit and without having to use grounding pins, without having to heat the container, and without having to apply an additional conductive coating layer after step (b).

15. The method set forth in claim 14 wherein step (f) is carried out at an ambient temperature.

16. The method set forth in claim 14 wherein said cold end coating is at least partially removed before step (f).

17. The method set forth in claim 14, wherein the coating is ten to forty nm in thickness.

18. The method set forth in claim 14 wherein said exterior surface has a electrical resistivity of less than or equal to $10^{10}$ Ohm-cm.

19. The method set forth in claim 14 wherein said exterior surface has a electrical resistivity of less than or equal to $10^6$ Ohm-cm.

* * * * *